Feb. 7, 1961
L. S. HAYS
2,970,401
LIVE BAIT AERATOR
Filed July 2, 1958
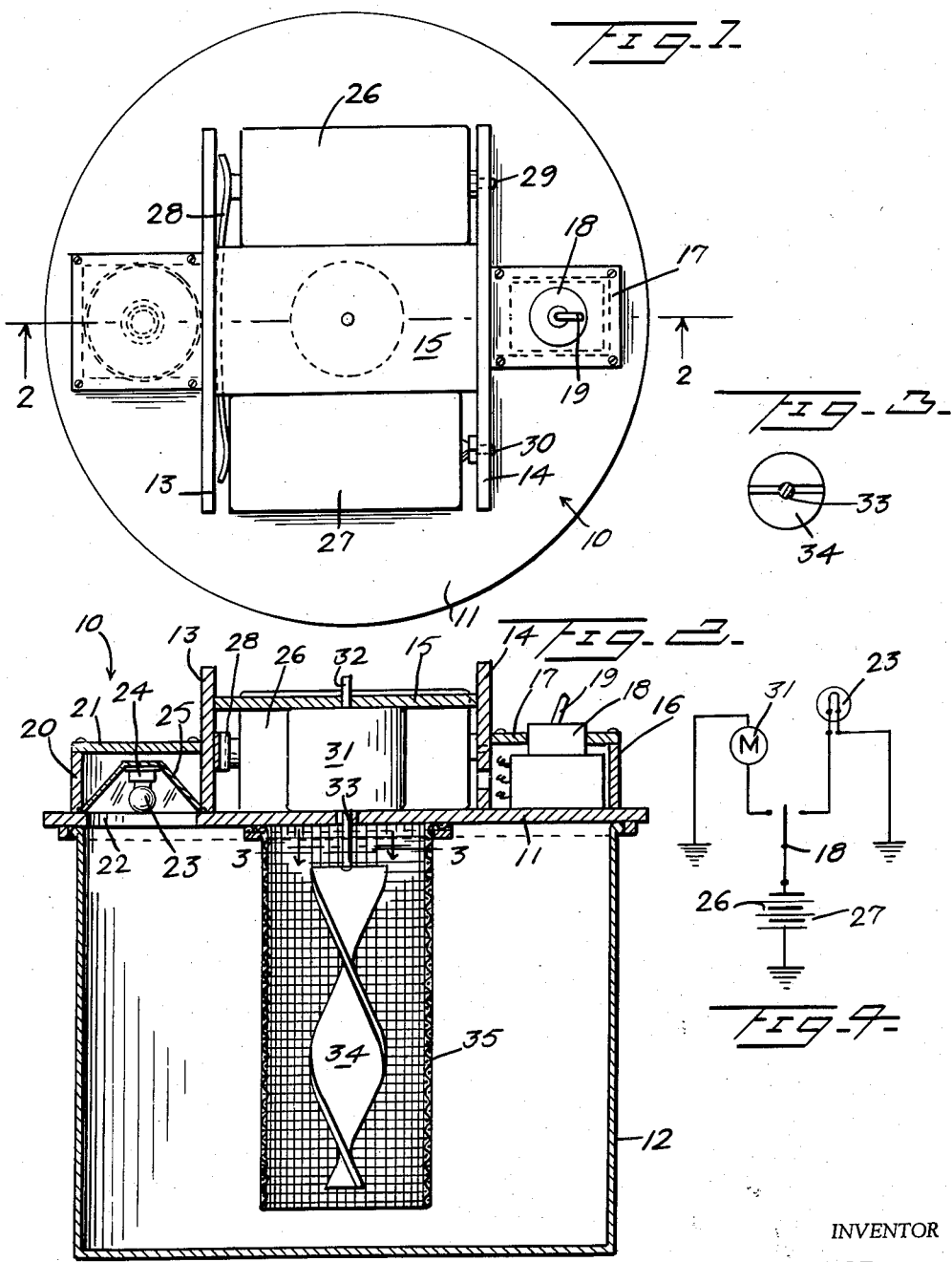
INVENTOR
Lawrence S. Hays
BY Kimmel & Crowell
ATTORNEYS

2,970,401
LIVE BAIT AERATOR

Lawrence S. Hays, 503 Seguin Road, Converse, Tex.

Filed July 2, 1958, Ser. No. 746,186

1 Claim. (Cl. 43—57)

The present invention relates to live bait aerators, and more particularly to aerators which agitate the water containing the live bait.

The primary object of the invention is to provide an aerator agitator for live bait containers which is operated from dry cell batteries for use in motor vehicles, boats, and at points remote from electrical service.

Another object of the invention is to provide a live bait aerator of the class described above which is light in weight and is readily portable.

A further object of the invention is to provide a live bait aerator of the class described above having bait tank illuminating means associated therewith and selectively operable from the batteries of the device.

A still further object of the invention is to provide a live bait aerator of the class described above which is inexpensive to manufacture, simple to use, and which is effective in keeping the bait alive.

Other objects and advantages will become apparent in the following specification when considered in the light of the attached drawings, in which:

Figure 1 is a top plan view of the invention.

Figure 2 is a vertical section taken along the line 2—2 of Figure 1, looking in the direction of the arrows.

Figure 3 is a fragmentary horizontal section taken along the line 3—3 of Figure 2, looking in the direction of the arrows.

Figure 4 is the wiring diagram of the device.

Referring now to the drawings in detail wherein like reference characters indicate like parts throughout the several figures, the reference numeral 10 indicates generally a live bait aerator constructed in accordance with the invention.

The live bait aerator 10 includes a generally flat platform 11 formed to fit the top of a live bait container 12 of conventional construction. The platform 11 is provided with a pair of upstanding spaced apart parallel walls 13, 14 connected by a generally horizontal wall 15. The horizontal wall 15 is spaced above and is parallel to the platform 11.

A housing 16 is secured to the platform 11 adjacent the wall 14 and has a removable cover 17 secured thereto. A single pole double throw switch 18 is mounted in the housing 16 and has a lever 19 projecting upwardly therefrom.

A housing 20 is secured to the platform 11 in contact with the wall 13 and has a removable cover 21 secured thereto. The platform 11 has an opening 22 underlying the housing 20 to permit light from a bulb 23 to shine therethrough. The bulb 23 is mounted in a conventional socket 24 and provided with a reflector 25 to intensify its rays.

A pair of dry cell batteries 26, 27 are mounted in series between the walls 13, 14 and are connected by a common spring bar 28 supported on the wall 13. The wall 14 has a contact lug 29 for engaging the battery 26 at one end thereof and another lug 30 for engaging the opposite end of the battery 27.

A relatively small electric motor 31 is mounted on the platform 11 and supported by the wall 15 as best seen in Figure 2. The motor 31 has a shaft 32 which projects through a port 33 in the platform 11 and carries a twisted agitator blade 34 on the lower end thereof. A wire cage 35 is secured in depending relation to the platform 11 encompassing the agitator 34.

In the use and operation of the invention, the switch 18 can be positioned to energize the bulb 23 or the motor 31 whichever is desired. Operation of the motor 31 and the agitator blade 34 secured thereto will create turbulence within the bait container 12 so that the water will be aerated sufficiently to maintain bait in live condition therein. The wire cage 35 prevents contact of the live bait with the agitator blade 34 to prevent injury to either the bait or the agitator blade 34.

Having thus described the preferred form of the invention, it should be understood that numerous structural modifications and adaptations may be resorted to without departing from the scope of the appended claim.

What is claimed is:

A live bait aerator comprising an upstanding generally cylindrical container having the upper end thereof open, a generally flat horizontal platform mounted on said open end of said container, said platform having a vertical bore extending therethrough adjacent the edge thereof, an electric motor mounted centrally on the top of said platform, a pair of spaced apart parallel upstanding walls fixedly secured to the upper side of said platform, said motor being disposed intermediate said walls, a horizontal wall fixedly secured to and extending between the upper edges of said upstanding walls and overlying said motor, a shaft extending through said motor, one end of said shaft extending through said horizontal wall, the other end of said shaft extending through said platform into said container, a twisted agitator blade fixedly secured to and depending from said other end of said shaft for rotation therewith, a substantially cylindrical wire cage fixedly secured to and depending from the bottom of said platform, said cage encompassing said agitator blade, a light mounted on said platform above said bore for illuminating the interior of said container, a pair of dry cell batteries disposed intermediate said upstanding walls for supplying power to said motor and a switch mounted on said platform for selectively controlling the flow of current from said dry cell batteries to said light and said motor.

References Cited in the file of this patent

UNITED STATES PATENTS

| | | |
|---|---|---|
| 1,284,945 | Swan | Nov. 12, 1918 |
| 1,539,087 | Horrell | May 26, 1925 |
| 2,042,176 | Hausman | May 26, 1936 |
| 2,364,686 | Balister et al. | Dec. 12, 1944 |